Figure 1:
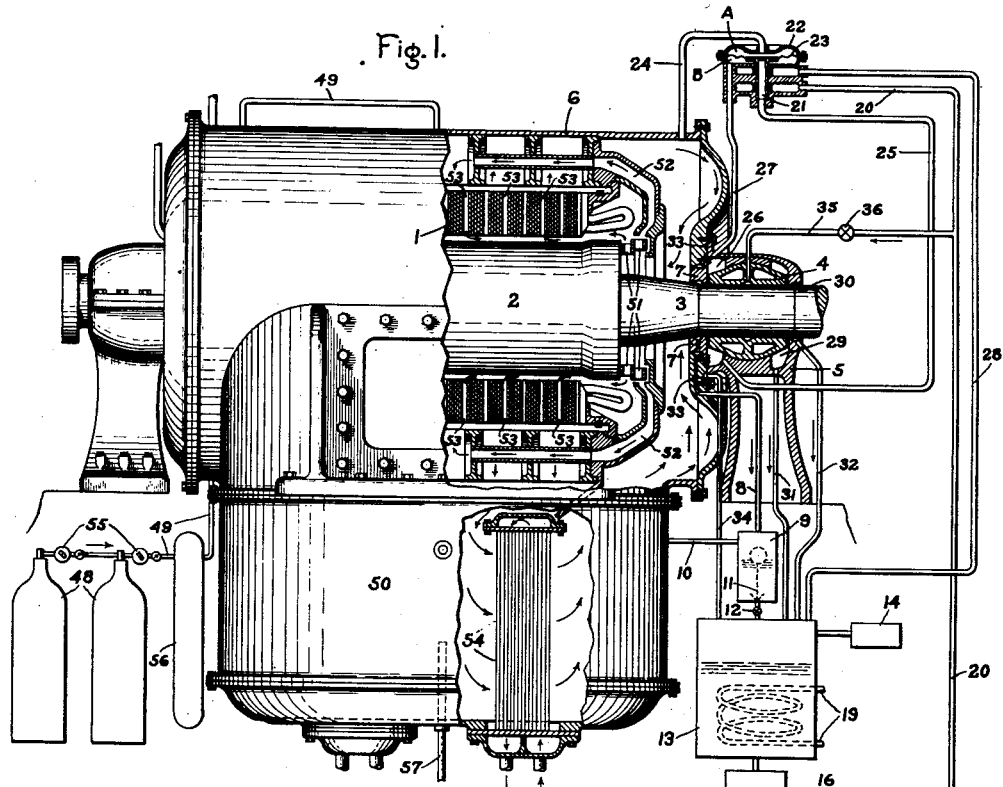

Oct. 27, 1925.

C. W. RICE

DYNAMO ELECTRIC MACHINE

Filed Nov. 23, 1923

1,559,182

Inventor:
Chester W. Rice,
by
His Attorney.

Patented Oct. 27, 1925.

1,559,182

UNITED STATES PATENT OFFICE.

CHESTER W. RICE, OF SCHENECTADY, NEW YORK, ASSIGNOR TO GENERAL ELECTRIC COMPANY, A CORPORATION OF NEW YORK.

DYNAMO-ELECTRIC MACHINE.

Application filed November 23, 1923. Serial No. 676,647.

*To all whom it may concern:*

Be it known that I, CHESTER W. RICE, a citizen of the United States, residing at Schenectady, in the county of Schenectady, State of New York, have invented certain new and useful Improvements in Dynamo-Electric Machines, of which the following is a specification.

My invention relates to dynamo electric machines having a closed ventilating system in which a gas lighter than air, such as hydrogen is circulated and recirculated for the purpose of cooling the same, and more particularly to such machines having liquid seals for preventing the escape of the cooling gas.

The object of my invention is to provide a liquid seal which will prevent the escape of the ventilating gas by admixture with the sealing liquid, which may be either by mechanical intrainment or by solution and also prevent contamination of the sealing liquid by the gas used as the cooling medium.

When a gas lighter than air is used in a ventilating system for dynamo electric machines, the windage loss is reduced approximately in the proportion that the density of the gas used, bears to the density of air. Since hydrogen is much lighter than air and since its heat conduction and forced convection is much better than air, dynamo electric machines operating in an atmosphere of hydrogen will run much cooler than such machines will run in air.

In order to ventilate a dynamo electric machine with a gas such as hydrogen, it is necessary to provide a gas-tight casing to prevent the escape of the gas, and also to prevent contamination of the gas within the casing by the surrounding air. The most difficult joints, of such a casing, to seal are those where the shaft extends through the ends of the casing. Liquid seals have been suggested for use at these points and with this type of seal it is possible to prevent a direct escape of the gas, but the sealing liquid by reason of its flow becomes admixed with some of the gas and unless some means is provided to free this gas and return it to the casing it will be lost. In accordance with one aspect of my invention, I provide a seal having means whereby this admixed gas is trapped and returned to the casing.

In accordance with another aspect of my invention, I provide a drain from the seal through which the sealing liquid flows by gravity, whereby the excess liquid is removed and prevented from entering the casing.

The various features of novelty which characterize my invention are pointed out in the claims annexed to and forming a part of this specification. For a better understanding of my invention reference may be had to the following description taken in connection with the accompanying drawing, in which Fig. 1 shows a side elevation, partly in section, of a dynamo electric machine embodying my invention, and Fig. 2 shows a modified form of my invention, as applied to the machine shown in Fig. 1.

Figure 2:
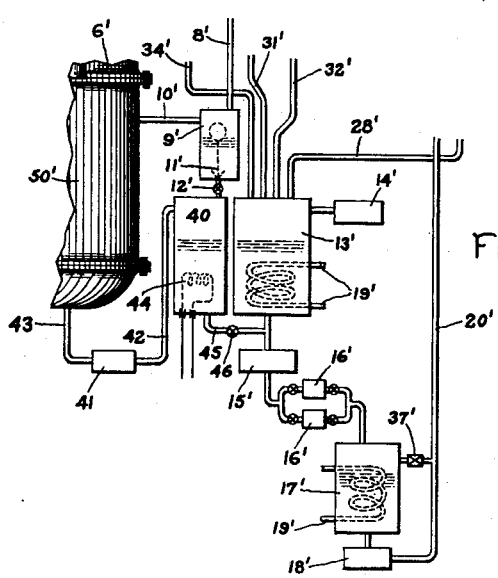

In Fig. 1 of the drawing, 1 is the stator of a dynamo electric machine having a rotatable member 2 mounted on a shaft 3, which is journaled in bearings 4. Cooperating with the bearings 4 is a casing 6 surrounding the dynamo electric machine to form a closed circuit for the circulation and recirculation of a gas lighter than air for cooling the machine.

The most difficult joints of the casing to make tight, as previously stated, are those surrounding the shaft 3 adjacent the bearings 4. These joints are most effectively made tight by liquid seals which consist of a liquid such as oil, maintained at substantially the same or higher pressure than the gas within the casing, and permitting the pressure of the liquid as it flows in a restricted passage along the shaft and approaches the gas, to fall, so that somewhere within the confines of this restricted passage an equilibrium in pressure between the confined gas and the liquid of the seal is reached, whereby no gas can escape.

It has been found, however, that the liquid, because of its contact with the gas and its continuous flow through the seal has a tendency to carry off a portion of the gas by admixture and thus form a path of escape for the gas from the casing 6. To overcome the above difficulty, I provide a sealing means 7 comprising a chamber 26 surrounding the shaft 3 and containing a liquid under pressure and a second chamber also surrounding the shaft, this second chamber being located between chamber 26 and the rotatable member 2 and connected to a drain comprising a discharge pipe 8 through which the liquid flows by gravity.

With this arrangement excess liquid is removed from the bearing and prevented from entering the machine. The discharge pipe 8 is connected to a trap 9 in which the admixed gas is trapped and separated from the sealing liquid. A pipe 10 connects the trap 9 with the casing 6 to permit the separated gas to return to the casing 6. The trap 9 contains a float valve 11 which maintains a substantially constant volume of gas therein and permits the excess sealing liquid to flow through a pipe 12 to a receiving tank 13 in which a rough vacuum is maintained in the space above the sealing liquid by means of a pump 14. Connected to the bottom of the tank 13 is a filter pump 15 which forces the sealing liquid through the filters 16 into a tank 17 or other suitable source of supply from which the sealing liquid is pumped by a pump 18 to the seal. Cooling coils 19 are provided in the receiving tank 13 and the source of supply 17 for the purpose of cooling the sealing liquid as it passes therethrough. A pipe 20 connects the pump 18 with the lower ports of a throttle valve 21 which is controlled by a pressure regulator 22 having a movable diaphragm 23 separating the chambers A and B of said regulator. The chamber or compartment A communicates with the interior of the casing of the machine and is therefore subjected to the pressure of the gas within the machine and chamber or compartment B communicates with chamber 26 and is therefore subject to the pressure of the liquid in the seal. The separation of these compartments A and B prevents the sealing liquid from absorbing gas from the machine. The throttle valve 21 can be of any suitable type. I have shown it as of the sleeve type. The casing 6 is connected to chamber A of the regulator 22 by means of a pipe 24 to maintain a pressure in this chamber equal to that in the casing 6. When the throttle valve 21 operates, the pipe 20 will supply oil in varying amounts through throttle valve 21, and a pipe 25 to a chamber 26 surrounding the shaft 3. Chamber 26 communicates with chamber B of the regulator 22 through a pipe 27 which permits the sealing liquid to come into contact with the diaphragm 23 of the regulator 22 and cause it to move in response to changes in the pressure of the sealing liquid in chamber 26. The pressure of the sealing liquid at the seal is thus automatically maintained slightly greater than the pressure of the cooling gas within the casing irrespective of the rate of flow of the liquid through the bearing 4 due to changes in temperature, bearing clearances, etc. The throttle valve 21 operates under two ranges of pressure, one of which is when the cooling gas pressure is slightly greater than atmospheric which I shall call low pressure and the other when the pressure of the cooling gas is several atmospheres which I shall call high pressure. In order to do this I provide the throttle valve 21 with two sets of ports, which I shall designate as upper and lower ports. The lower ports operate to throttle the flow of sealing liquid which is supplied to the seal and bearing when the machine is operating with the cooling gas under a high pressure and the upper ports operate to throttle the flow of sealing liquid discharged from the seal when the machine is operating with the cooling gas under a low pressure. When the machine is operating with a low gas pressure the diaphragm 23 will take such a position that the lower ports of the throttle valve 21 will be closed and the upper ports will open and close to throttle the discharge flow of oil which passes through the upper ports and thereby maintain a pressure in chamber B equal to the pressure existing in chamber A of the regulator 22. The sealing liquid under these conditions is supplied to chamber 26 through a pipe 35. When the machine is operating under a high gas pressure the diaphragm 23 will take a position which will close the upper ports of throttle valve 21 and throttle the supply flow of oil which enters the bearing 4 and the seal 7 through the lower ports, and again maintain the pressure of the oil in chamber B equal to the pressure of the gas in chamber A of the regulator 22. The sealing liquid under these conditions is supplied to chamber 26 through pipes 20 and 25.

In the present embodiment of my invention, I prefer to use a lubricating oil as the sealing liquid, and have shown in the drawing the sealing means 7 operating in conjunction with the bearing 4. It should be understood, however, that the sealing means 7 need not necessarily operate in conjunction with the bearing 4.

When the machine is operating with the cooling gas under a high pressure, the sealing liquid, as stated, will be throttled through the lower ports of valve 21 and enter chamber 26 through pipes 20 and 25. After entering the annular chamber 26 the sealing liquid will flow along the shaft 3 in two directions, to the right to lubricate the bearing 4, and to the left to form the seal, and when the machine is operating with the cooling gas only slightly above atmospheric pressure the sealing liquid will enter the bearing 4 through pipe 35 and flow along the shaft toward the chamber 26 and the seal and also in the opposite direction toward the end of the shaft. Under the latter condition of operation the lower ports of throttle valve 21 will be closed and the excess sealing liquid supplied to chamber 26 will flow back through the upper ports of the throttle valve to pipe 28 and into receiving tank 13. At the outer end of the bearing 4 is an annular chamber 29 for collecting the lubricating oil as it comes from the bearing, and as a precautionary measure a seal 30 is also provided at the outer end of the bearing support to prevent any leakage of coil along the shaft 3. Pipes 31 and 32 connect the annular chamber 29 and seal 30 respectively to the receiving tank 13 and thereby return the lubricating oil to the system for further use. An annular groove 33 is provided in the casing 6 for sealing the joint formed between the casing 6 and the bearing support 5. A pipe 34 is also provided for connecting the groove 33 with the receiving tank 13 and carry off the flow of oil. It will be seen that when the machine is operating with the cooling gas at substantially atmospheric pressure, there will not be sufficient pressure to maintain the flow of oil through bearing 4 required for proper lubrication. I have, therefore, provided the pipe 35 connecting the supply pipe 20 to the bearing 4 with a hand-operated throttle valve 36 which is opened under these conditions to supply the bearing 4 and the seal 7 with the proper amount of oil. I also provide a relief or safety valve 37 which when it opens, due to the occurrence of excessive pressure in the supply pipe 20, will permit the sealing liquid to flow back into the supply tank 17.

In order to supply the dynamo electric machine with a gas lighter than air, preferably hydrogen, gas tanks 48 are provided containing such gas. The tanks are connected by a pipe 49 to the top of the casing 6. The pipe 49 has reducing valve 55 placed therein to regulate the gas supply from the gas tanks 48. If desired, the gas dryer 56 may be placed in pipe 49 to dry the gas before it enters the casing. The gas tanks supply gas under pressure and the reducing valves 55 may be used to regulate the pressure of the gas supplied to the casing, which may be substantially that of the atmosphere, or considerably greater than that of the atmosphere. The gas is circulated and recirculated through the dynamo electric machine. It is drawn by the fans 51 in two paths, one through the passages 52 and through the centrally located ventilating passages 53 in the stator, and then discharged into the gap between the rotatable member and the stator, and the other over the rotatable member 2 into the gap. The two streams of gas are combined in the gap and are discharged through the ventilating passages 53 into the base of the casing and then pass over the coolers or radiators 54 whereby they are cooled. The cooling medium is then returned to the entrance of the fans.

In order to determine the presence of air that may be drawn into the casing and mixed with the hydrogen, a device 57 may be placed within the casing. This device may consist of a wire through which a current of electricity is passed and the resistance of which is measured. It is well understood that the resistance of the wire will vary, depending upon the mixture of air and hydrogen which comes in contact with it. By noting the difference in the resistance of this wire, the amount of air mixed with the hydrogen may be determined.

I shall now describe the operation of my invention when operating under high pressure. Assume that the dynamo electric machine is operating and the casing 6 is filled with a cooling gas under a high pressure, and that the other apparatus shown in the drawing is also in operative condition. Assume now a slight increase of pressure to occur in the machine due to a rise in temperature. Under these conditions the gas from the casing 6 will exert a pressure in chamber A of the regulator 22 through pipe 24 and cause the diaphragm 23 to be depressed. This will increase the opening of the lower ports of throttle valve 21 and permit more oil to flow through pipe 25 into chamber 26 and the adjacent sealing means 7 until the pressure of the oil in chamber B is again equal to the pressure in chamber A and an equilibrium of pressures is established. The oil in chamber 26 will, as a result of pipe 27, be under a pressure equal to the pressure of the cooling gas, plus the pressure created by the head of the oil in pipe 27. This will cause the oil to flow from the annular chamber 26 toward the bearing 4, and toward the seal 7.

The oil which flows toward the seal enters the sealing means 7 and is discharged through the pipe 8 into the trap 9. As the oil enters the trap 9 any gas which is admixed with the oil will be separated therefrom and will return to the casing 6 through the pipe 10. When a predetermined amount of oil accumulates in the trap 9 the float valve 11 operates to permit sufficient oil to escape to maintain the volume of gas in the trap 9 substantially constant. The escaping oil flows through a pipe 12 to the receiving tank 13. The oil is then pumped from tank 13 by pump 15 through the filters 16 to the source of supply 17 where it remains until pumped back into the system through pipe 20 by pump 18. The pump 18 is regulated to operate in conjunction with the throttle valve 21, and relief valve 37, to maintain a pressure on the oil in chamber B of regulator 22 equal to the pressure of the gas in chamber A. The excess oil, which is pumped toward the throttle valve 21, flows back to the receiving tank 13 through the relief valve 37 to be used over again.

The oil which flows from the annular chamber 26 toward the bearing 4 and the seal 30 flows along the shaft 3 to provide lubrication, and enters chamber 29 and seal 30. It then returns to the receiving tank 13 through pipes 31 and 32 respectively. A small amount of the oil in the annular chamber 26 will flow to the seal 33 and will be discharged from this seal to the receiving tank 13 through a pipe 34. Should the pressure of the oil in chamber 26 become too high, the oil in pipe 27 will exert a pressure in chamber B of the regulator 22 and raise the diaphragm 23, thereby partly closing the lower ports of the throttle valve 21 and reducing the flow of oil until an equilibrium is again established.

When the machine is operating with the cooling gas at a low pressure there will not be sufficient oil flow through the bearing to give proper lubrication. Under these conditions valve 36 is opened and the regulator 22 is caused to take a new mean position in which the lower ports are closed and the upper ports caused to regulate the discharge of oil which will flow from chamber 26 through pipe 25 to valve 21. This oil after passing through the upper ports of throttle valve 21 will then flow through pipe 28 to the receiving tank 13.

Referring now to the modification shown in Fig. 2 of the drawing, similar numerals on the respective figures refer to similar parts. In this modification, I contemplate the use of all the elements shown and described in connection with Fig. 1, together with additional means to more effectively prevent the escape of the gas and especially where the admixture is the result of absorption. It is well known that liquids will absorb gases and that the volume of gas which will be absorbed by a liquid depends upon the pressure and temperature at which they are maintained, and since a unit volume of liquid at a certain temperature can absorb a given volume of gas, it follows that the mass of gas absorbed by a unit volume of liquid will be proportional to the pressure to which the gas and liquid are subjected. From the above it will be seen that the cooling gas in the casing 6' will be absorbed and evolved by the sealing liquid as it circulates through the system and that in order to prevent the escape of this gas or contamination of the sealing liquid by the gas, means must be provided to evolve the absorbed gas which remains in the cooling liquid at the pressure existing in tank 9' and return it to the dynamo-electric machine casing. I, therefore, in accordance with this modification, provide a separate receiving tank 40 to receive the sealing liquid discharged from tank 9'. I also provide a means 41 to create a rough vacuum in tank 40 and to pump the gas evolved from the sealing liquid, back into the dynamo-electric machine casing 6'. Connecting the means 41 with the receiving tank 40 is a pipe 42 and connecting the discharge end of means 41 to the casing 50' is a pipe 43. The receiving tank 40 is provided with a heater 44 to raise the temperature of the sealing liquid received thereby and assist in the evolution of the gas absorbed therein. Connected to the bottom of the receiving tank 40 is a pipe 45 having a one-way valve 46.

The operation of this modification of my invention is as follows. The sealing liquid after passing through the seal which is similar to seal 7 in Fig. 1 flows down pipe 8' to trap 9' which is in connection with the casing 50' and under a pressure equal to that prevailing in the casing 6'. At this point, as previously stated, the admixed gas, which will be liberated at the pressure existing in tank 9', will be separated from the sealing liquid and returned to the casing 6' through pipe 10'. When sufficient sealing liquid accumulates in trap 9' the float valve 11' will open and permit the excess sealing liquid to flow into the receiving tank 40. This excess sealing liquid as it enters the receiving tank 40 will contain an amount of absorbed gas dependent upon the pressure existing in tank 9' at the time the liquid is discharged, and since the amount of gas which will remain in equilibrium in a liquid depends upon the pressure and temperature, it will be seen by reason of the reduced pressure and increased temperature in tank 40 that the absorbed gas remaining in the sealing liquid will expand and evolve therefrom. This evolved gas will then be pumped into casing 6' by the pumping means 41, and the sealing liquid substantially free from absorbed gas will collect in the receiving tank 40. The pump 15' will then pump the sealing liquid from tanks 40 and 13' through the filters 16' into the source of supply 17' for use in the sealing means and for lubrication, in the manner hereinbefore described. The one way valve 46 is provided to regulate the flow of the sealing liquid from tank 40 and prevent the oil in tank 13' from flowing into tank 40. The pump 14' in this modification maintains a rough vacuum in tank 13' as before stated and exhausts into the atmosphere.

Any usual and well known arrangement of the ventilating passages of the dynamo electric machine may be employed, but I have illustrated in the drawing the ventilating arrangement of the Holcombe Patent No. 1,269,537, dated June 11, 1918. I desire it to be understood that my invention is not limited to the particular arrangement shown and described, and I aim in the appended claims to cover all modifications which do not depart from the spirit and scope of my invention.

What I claim as new and desire to secure by Letters Patent of the United States, is:—

1. In combination, a dynamo electric machine having a rotatable member mounted on a shaft, a casing cooperating with the dynamo electric machine to form a closed circuit for the circulation and recirculation of gas lighter than air for cooling said machine, means forming a liquid seal for preventing the escape of gas from said casing, said seal comprising a chamber surrounding said shaft and containing a liquid for preventing the escape of gas from said casing, a second chamber also surrounding said shaft, said second chamber being located between said first mentioned chamber and said rotatable member, and a drain connected to said second chamber through which said liquid flows by gravity whereby the excess liquid is removed and said liquid prevented from entering said machine.

2. In combination, a dynamo electric machine having a rotatable member mounted on a shaft, a casing cooperating with the dynamo electric machine to form a closed circuit for the circulation and recirculation of gas lighter than air for cooling said machine, a seal for said shaft for preventing the escape of gas from said casing, said seal comprising a chamber surrounding said shaft and containing a liquid for preventing the escape of gas from said casing, a second chamber also surrounding said shaft, said second chamber being located between said first mentioned chamber and said rotatable member, and a drain connected to said second chamber through which said liquid flows by gravity whereby the excess liquid is removed and said liquid prevented from entering said machine, and a pump between said drain and said seal for returning said liquid to said first mentioned chamber.

3. In combination, a dynamo electric machine having a rotatable member mounted on a shaft, a bearing for said shaft, a casing cooperating with the dynamo electric machine to form a closed circuit for the circulation and recirculation of gas lighter than air for cooling said machine, means for preventing the escape of gas from said casing comprising a chamber surrounding said shaft, and supplied with a liquid under pressure, a second chamber also surrounding said shaft, said second chamber being located between said first mentioned chamber and said rotatable member, a drain connected to said second chamber through which said liquid flows by gravity, whereby the excess liquid is removed and said liquid prevented from entering said machine and a separator in said drain for separating from said liquid any gas contained therein.

4. In combination, a dynamo electric machine having a rotatable member mounted on a shaft, a casing cooperating with the dynamo electric machine to form a closed circuit for the circulation and recirculation of gas lighter than air for cooling said machine, and means forming a liquid seal surrounding said shaft to prevent the escape of gas from said casing, comprising means forming a chamber surrounding said shaft, means for circulating a sealing liquid through said chamber, a second chamber also surrounding said shaft, said second chamber being located between said first mentioned chamber and said rotatable member, and a drain connected to said second chamber through which said liquid flows by gravity, whereby the excess liquid is removed and said liquid prevented from entering said machine, and means for automatically maintaining the sealing liquid in said first mentioned chamber above the pressure of the gas in said machine comprising a regulator controlling a valve and having a compartment communicating with the interior of said machine and a second compartment communicating with said first mentioned chamber surrounding said shaft and subject to the pressure of said liquid, said compartments of said regulator being separated from each other to prevent said liquid from absorbing the gas in said machine.

5. In combination, a dynamo electric machine having a rotatable member mounted on a shaft, a casing cooperating with the dynamo electric machine to form a closed circuit for the circulation and recirculation of gas lighter than air for cooling said machine, and a seal comprising a chamber surrounding said shaft and containing a liquid under pressure, a second chamber also surrounding said shaft, said second chamber being located between said first mentioned chamber and said rotatable member, and a drain connected to said second chamber through which said liquid flows by gravity, whereby the excess liquid is removed and said liquid prevented from entering said machine, means for maintaining the pressure of the liquid in said first mentioned chamber above the pressure of the gas in said machine comprising a regulator controlling a valve and having a compartment communicating with the interior of said machine and a second compartment communicating with said first mentioned chamber surrounding said shaft and subject to the pressure of said liquid, said compartments of said regulator being separated from each other to prevent said liquid from absorbing the gas in said machine, and a pump between said drain and said regulator.

6. In combination, a dynamo electric machine having a rotatable member mounted on a shaft, a casing cooperating with the dynamo electric machine to form a closed circuit for the circulation and recirculation of gas lighter than air for cooling said machine, and a liquid sealing means to prevent the escape of gas from said casing comprising means forming a chamber surrounding said shaft and containing a liquid under pressure, means for maintaining the pressure of the liquid in said chamber higher than the pressure of the said gas, a source of supply for said liquid, a second chamber also surrounding said shaft, said second chamber being located between said first mentioned chamber and said rotatable member, and a drain connected to said second chamber through which said liquid flows by gravity, whereby the excess liquid is removed and said liquid prevented from entering said machine, means connecting said drain with said source of supply, a gas separating device in said drain for preventing the escape of the gas by admixture with said sealing liquid, and means for returning the separated gas to the casing.

7. In combination, a dynamo electric machine having a rotatable member mounted on a shaft, a casing cooperating with the dynamo electric machine to form a closed circuit for the circulation and recirculation of a gas lighter than air for cooling said machine, and a liquid sealing means surrounding said shaft for preventing the escape of gas from said casing comprising means forming a chamber containing a liquid under pressure, means for maintaining the pressure of the liquid higher than the pressure of said gas, a source of supply for said liquid, means connecting said chamber with said source of supply having a trap therein to recover the gas contained in said liquid, and means in said trap for maintaining a constant level of liquid therein.

8. In combination, a dynamo electric machine having a rotatable member mounted on a shaft, a casing cooperating with the dynamo electric machine to form a closed circuit for the circulation and recirculation of gas lighter than air for cooling said machine, and a liquid sealing means surrounding said shaft for preventing the escape of gas from said casing comprising means forming a chamber containing a liquid under pressure, means for maintaining the pressure of said liquid higher than the pressure of said gas, a source of supply for said liquid, means connecting said chamber with said source of supply having a trap therein to recover the gas contained in said liquid, means in said trap for maintaining a constant level of sealing liquid therein, a tank for receiving the liquid discharged from said trap, and means for conducting said liquid from said tank to said source of supply.

9. In combination, a dynamo electric machine having a rotatable member mounted on a shaft, a casing cooperating with the dynamo electric machine to form a closed circuit for the circulation and recirculation of gas lighter than air for cooling said machine, and a liquid sealing means surrounding said shaft to prevent the escape of gas from said casing comprising means forming a chamber containing a liquid under pressure, means for maintaining the pressure of said liquid higher than the pressure of said gas, a tank forming a trap to recover the gas contained in said liquid, means connecting the discharge side of said sealing means with said tank, means in said trap to maintain a constant level of liquid therein, a second tank for receiving the discharge of liquid from said trap, means for creating a reduced pressure in said second tank for causing the evolution of absorbed gas and returning it to the casing, a source of supply for supplying the sealing liquid, and means for conducting the liquid from said second tank to said source of supply.

10. In combination, a dynamo electric machine having a rotatable member mounted on a shaft, a casing cooperating with the dynamo electric machine to form a closed circuit for the circulation and recirculation of gas lighter than air for cooling said machine, a chamber containing a liquid under pressure surrounding said shaft to prevent the escape of gas from said casing and lubricate said bearing, means for supplying the liquid to said chamber through said bearing when operating under low pressure, a source of supply for said liquid, and means for returning said liquid to said source of supply having a trap therein for receiving admixed gas.

11. In combination, a dynamo electric machine having a rotatable member mounted upon a shaft, a casing cooperating with said dynamo electric machine to form a closed circuit for the circulation and recirculation of a gas lighter than air for cooling said machine, means forming a liquid seal surrounding said shaft to prevent the escape of the cooling gas, a sealing liquid for said seal, and means for separating entrained and absorbed gas from said sealing liquid comprising a trap having a float valve for maintaining a constant volume of gas under pressure therein, means for returning the excess gas to said casing, a tank adapted to receive the liquid discharged from said trap, means for maintaining a reduced pressure in said tank to evolve the absorbed gas from said sealing liquid, and means for returning the evolved gas to said casing.

12. In combination, a dynamo electric machine having a rotatable member mounted on a shaft, a casing cooperating with the dynamo electric machine to form a closed circuit for the circulation and recirculation of a gas lighter than air for cooling said machine, and a liquid sealing means surrounding said shaft for preventing the escape of gas from said casing comprising means forming a chamber containing a liquid under pressure, means for maintaining the pressure of said liquid higher than and responsive to the pressure of said gas, a source of supply for said liquid, means connecting said chamber with said source of supply having a trap therein to recover the gas contained in said liquid, means in said trap for maintaining a constant level of sealing liquid therein, a second tank for receiving the liquid discharged from said trap, and means in said second tank for causing the evolution of gas from said sealing liquid.

13. In combination, a dynamo electric machine having a rotatable member mounted on a shaft, a casing cooperating with the dynamo electric machine to form a closed circuit for the circulation and recirculation of a gas lighter than air for cooling said machine, and a liquid sealing means surrounding said shaft for preventing the escape of gas from said casing comprising means forming a chamber containing a liquid under pressure, means for maintaining the pressure of said liquid higher than and responsive to the pressure of said gas, a source of supply for said liquid, means connecting said chamber with said source of supply having a trap therein to recover the gas contained in said liquid, means in said trap for maintaining a constant level of sealing liquid therein, a second tank for receiving the liquid discharged from said trap, and a heater in said second tank for raising the temperature of the sealing liquid contained therein and causing the gas to evolve therefrom.

In witness whereof, I have hereunto set my hand this 22nd day of November, 1923.

CHESTER W. RICE.